(12) United States Patent
Sharifi Mehr

(10) Patent No.: US 10,103,878 B1
(45) Date of Patent: Oct. 16, 2018

(54) SEPARATION OF SECURITY CREDENTIAL VERIFICATION

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

(*) Notice: Subject to any disclaimer, the term of this patent is extended or adjusted under 35 U.S.C. 154(b) by 429 days.

(21) Appl. No.: 14/854,883

(22) Filed: Sep. 15, 2015

(51) Int. Cl.
*G06F 21/00* (2013.01)
*H04L 9/08* (2006.01)
*H04L 29/06* (2006.01)
*G06F 21/31* (2013.01)
*G06F 21/30* (2013.01)

(52) U.S. Cl.
CPC .......... *H04L 9/0816* (2013.01); *G06F 21/30* (2013.01); *G06F 21/31* (2013.01); *H04L 63/0428* (2013.01); *H04L 63/083* (2013.01); *H04L 2209/24* (2013.01)

(58) Field of Classification Search
CPC .......... G06F 21/30; G06F 21/31; G06F 21/41; G06F 21/45; G06F 21/46; H04L 9/08; H04L 9/0861; H04L 9/0866; H04L 9/088; H04L 9/0894
See application file for complete search history.

(56) References Cited

U.S. PATENT DOCUMENTS

2007/0061571 A1* 3/2007 Hammes ................. G06F 21/31
713/168
2007/0288992 A1* 12/2007 Robinson .............. H04L 63/083
726/2

* cited by examiner

*Primary Examiner* — Edward Zee
(74) *Attorney, Agent, or Firm* — Thomas | Horstemeyer, LLP

(57) ABSTRACT

Disclosed are various embodiments for separating security credential verification. A first authentication service receives a first security credential from a client. The first authentication service also receives an encrypted version of a second security credential from a second authentication service. The first authentication service determines a stored encrypted credential corresponding to the second security credential based at least in part on the first security credential. The first authentication service authenticates the client by comparing the encrypted version of the second security credential to the stored encrypted credential.

20 Claims, 8 Drawing Sheets

US 10,103,878 B1

SEPARATION OF SECURITY CREDENTIAL VERIFICATION

BACKGROUND

When a user logs into a network account or accesses a secured computing service, the user may be required to provide one or more security credentials to confirm his or her identity. For example, a user may provide a username, a password, an answer to a knowledge-based question, a one-time password, biometric identification, and/or other security credentials. In a typical implementation, a hypertext markup language (HTML) form in a network page elicits a username and a password using separate form elements that are submitted to a single network service for verification.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to approaches for separating security credential verification. In a typical implementation, all required security credentials, such as a username and a password, are submitted to a single network service or endpoint for processing and verification. Although the credentials may be encrypted during transit, all of the credentials are processed and verified on the same computing system. While that computing system may be intended to be secured, it may happen that a malicious user is able to gain access. Despite following best practices for security involving firewalls, strong credentials, and applying security patches, unpublished or zero-day exploits may be leveraged by malicious users. If a malicious user does somehow gain access to the memory of the computer system that processes credentials, the user may then obtain usernames and passwords in clear text from the raw memory.

Various embodiments of the present disclosure separate the processing of security credentials into two or more computing systems. For example, where usernames and passwords are being verified, a first computing system obtains a username from a client, while a second computing system obtains a password from the client. The second computing system processes the password into a secured form and then sends the secured password to the first computing system. The first computing system verifies that a stored secured password indexed by the username corresponds to the secured password obtained from the second computing system. If the two correspond to one another, the first computing system authenticates the client, and a session token can be issued to the client. Multi-factor authentication can work in the same way, potentially employing additional separate computing systems.

Figure 1:
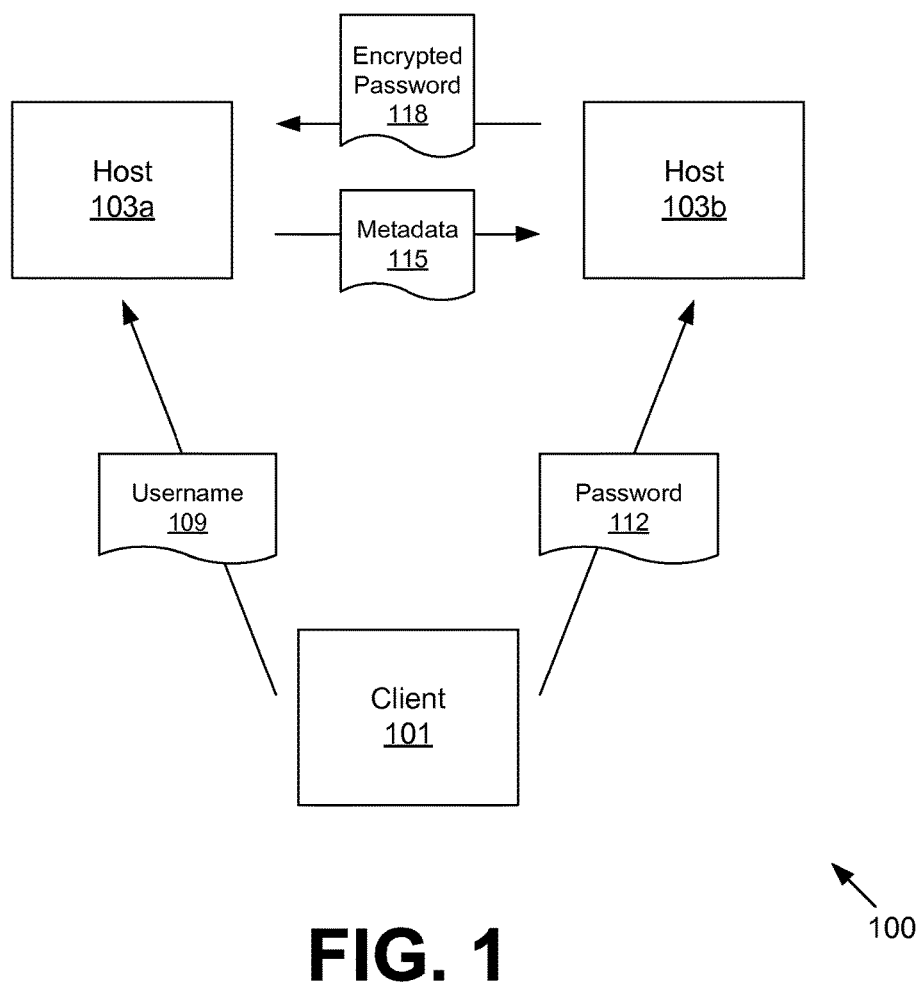
FIG. 1 is a pictorial diagram of an example scenario involving separation of security credential verification according to various embodiments of the present disclosure.

Referring now to FIG. 1, shown is a pictorial diagram of an example scenario 100 involving separation of security credential verification according to various embodiments. In the scenario 100, a client 101 is configured to send security credentials to two separate hosts 103a and 103b. Specifically, the client 101 sends the username 109 to the host 103a, and the client 101 sends the password 112 to the host 103a. The host 103a sends metadata 115 to the host 103b, which is used by the host 103b to generate an encrypted password 118. The host 103b then sends the encrypted password 118 to the host 103a. The host 103a is then able to perform verification of the encrypted password 118 by comparing the encrypted password 118 with a stored encrypted password that is associated with the username 109. In this way, neither the host 103a nor the host 103b has access to both the username 109 and the password 112. In the following discussion, a general description of the system and its components is provided, followed by a discussion of the operation of the same.

Figure 2:
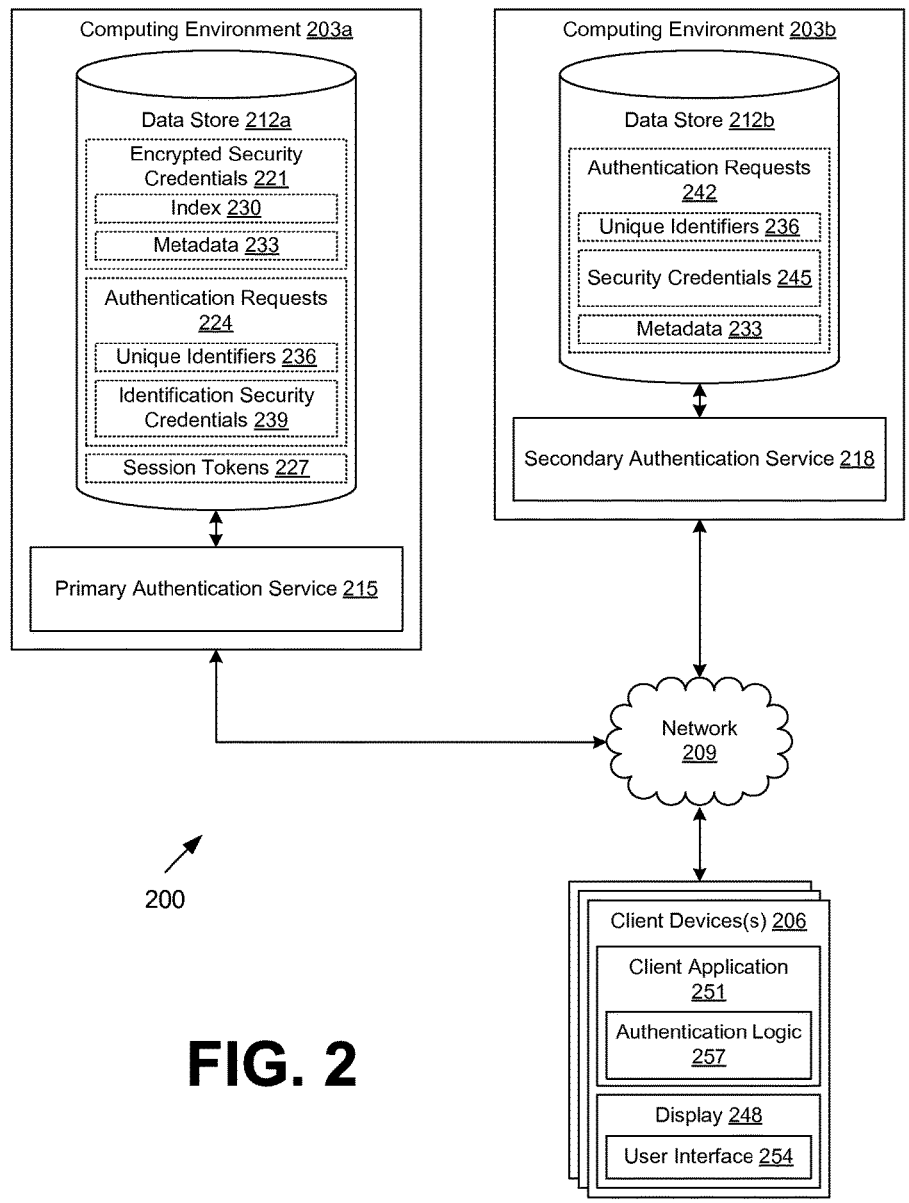
FIG. 2 is a schematic block diagram of a networked environment according to various embodiments of the present disclosure.

With reference to FIG. 2, shown is a networked environment 200 according to various embodiments. The networked environment 200 includes computing environments 203a and 203b and one or more client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environments 203a and 203b may comprise, for example, a server computer or any other system providing computing capability. Alternatively, the computing environments 203a and 203b may employ a plurality of computing devices that may be arranged, for example, in one or more server banks or computer banks or other arrangements. Such computing devices may be located in a single installation or may be distributed among many different geographical locations. For example, the computing environments 203a and 203b may include a plurality of computing devices that together may comprise a hosted computing resource, a grid computing resource, and/or any other distributed computing arrangement. In some cases, the computing environments 203a and 203b may correspond to an elastic computing resource where the allotted capacity of processing, network, storage, or other computing-related resources may vary over time.

Although the computing environments 203a and 203b are described as separate environments, it is understood that the computing environments 203a and 203b may correspond to a single computing environment in some embodiments. For example, the computing environments 203a and 203b may correspond to virtual machine instances on a same physical computing architecture. However, the memory spaces may be separated such that a program executed in the computing environment 203a may not have access to memory of the computing environment 203b or vice versa. In one embodiment, the computing environment 203b may correspond to a hardware security module.

Various applications and/or other functionality may be executed in the computing environments 203a and 203b according to various embodiments. Also, various data is stored in a data store 212a that is accessible to the computing environment 203a and a data store 212b that is accessible to the computing environment 203b. The data stores 212a and 212b may each be representative of a plurality of data stores as can be appreciated. The data stored in the data stores 212a and 212b, for example, is associated with the operation of the various applications and/or functional entities described below.

The components executed on the computing environment 203a, for example, include a primary authentication service 215 and other applications, services, processes, systems, engines, or functionality not discussed in detail herein. The primary authentication service 215 is executed to receive authentication requests from client devices 206 that include fewer than all security credentials required for authentication. For example, an authentication request received by the primary authentication service 215 may include a username but not a required password. The primary authentication service 215 communicates with one or more secondary authentication services 218 in order to receive encrypted versions of the missing security credentials. The primary authentication service 215 then compares the encrypted versions with stored encrypted versions. If they match, the primary authentication service 215 then authenticates the client device 206.

The data stored in the data store 212a includes, for example, encrypted security credentials 221, authentication requests 224, session tokens 227, and potentially other data. The encrypted security credentials 221 include data associated with security credentials that may be required in order to authenticate client devices 206. In this regard, the security credentials may include passwords, secure certificates, biometric identifiers, numerical codes, seeds for one-time passwords, answers to knowledge-based questions, and/or other credentials.

The encrypted security credentials 221 are encrypted using reversible or non-reversible encryption. For example, the encrypted security credentials 221 may be encrypted using reversible forms of encryption such as public key encryption (e.g., the Rivest-Shamir-Adleman (RSA) cryptosystem, the ElGamal encryption system, etc.) or symmetric key encryption (e.g., Advanced Encryption Standard (AES), Blowfish, etc.). Alternatively, the encrypted security credentials 221 may be encrypted using a non-reversible form of encryption such as a Secure Hash Algorithm (SHA), scrypt, bcrypt, or other password-based key derivation functions. The non-reversible form of encryption may include salting of the security credential before applying the cryptographic algorithm.

Each encrypted security credential 221 may be associated with an index 230 corresponding to a primary key for the data store 212a. This allows for an encrypted security credential 221 to be looked up on the basis of a unique identifier, such as a username or other security credential. Further, each encrypted security credential 221 may be associated with metadata 233 that may be used to generate the encrypted security credential 221 from an unencrypted security credential. To this end, the metadata 233 may include cryptographic salts and/or other parameters for password-based key derivation functions such as scrypt, bcrypt, and so on. Where the encrypted security credentials 221 are encrypted using a reversible form of encryption, the metadata 233 may include public keys or symmetric keys used to generate the encrypted security credentials 221. However, private keys or symmetric keys may be stored separately in a different data store 212a with access controls in order to restrict access to decrypt the encrypted security credentials 221 in the computing environment 203b.

The authentication requests 224 correspond to requests from client devices 206 to authenticate or verify access to secured resources or personalizations associated with a user account. Each authentication request 224 may be associated with a unique identifier 236 and one or more identification security credentials 239. The identification security credentials 239 (e.g., a username) are employed in order to identify a user account for which a client device 206 is requesting authentication. Such credentials may typically be regarded more as unique identifiers than as security credentials. However, the present disclosure regards usernames, etc., as security credentials in that for security purposes their verification is performed separately from passwords and other credentials. Further, the identification security credentials 239 may correspond to an index 230 into the encrypted security credentials 221 in order to identify a specific encrypted security credential 221 or set thereof as well as corresponding metadata 233. The unique identifier 236 is used to correlate requests for authentication that are sent separately to the primary authentication service 215 and the secondary authentication service 218. The unique identifier 236 may be generated server side, for example, by the primary authentication service 215 or client side by a client device 206. In one scenario, the unique identifier 236 is generated by a server-side rendering platform and transmitted to the client device 206 within a network page, a cookie, etc.

The components executed on the computing environment 203b, for example, include a secondary authentication service 218 and other applications, services, processes, systems, engines, or functionality not discussed in detail herein. The secondary authentication service 218 is executed to receive requests for authentication from client devices 206 that include fewer than all security credentials required for authentication. For example, an authentication request received by the secondary authentication service 218 may include a password but not a required username. The secondary authentication service 218 communicates with a primary authentication service 215 and/or a data store 212a to obtain metadata 233 used to generate encrypted versions of the credentials received in the requests. The secondary authentication service 218 then returns the encrypted versions to the primary authentication service 215 for verification.

The data stored in the data store 212b includes, for example, authentication requests 242 and potentially other data. The authentication requests 242 correspond to requests from client devices 206 to authenticate or verify access to secured resources or personalizations associated with a user account. Each authentication request 242 may be associated with a unique identifier 236, metadata 233, and one or more security credentials 245. The security credentials 245 may correspond to a password, a biometric identifier, an answer to a knowledge-based question, and/or other types of credentials. The unique identifier 236 is used to correlate requests for authentication that are sent separately to the primary authentication service 215 and the secondary authentication service 218. The unique identifier 236 may be generated server side, for example, by the primary authentication service 215 or client side by a client device 206.

The metadata 233 may be used to generate encrypted versions of the security credentials 245. To this end, the metadata 233 may include cryptographic salts and/or other parameters for password-based key derivation functions such as scrypt, bcrypt, and so on. Where the security credentials 245 are to be encrypted using a reversible form of encryption, the metadata 233 may include public keys or symmetric keys used to generate the encrypted versions.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, voice-controlled interactive devices, or other devices. The client device 206 may include a display 248. The display 248 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 251 and/or other applications. The client application 251 may be executed in a client device 206, for example, to access network content served up by the computing environment 203a and/or other servers, thereby rendering a user interface 254 on the display 248. To this end, the client application 251 may comprise, for example, a browser, a dedicated application, etc., and the user interface 254 may comprise a network page, an application screen, etc. The client application 251 may be configured to execute authentication logic 257 that facilitates authentication via the primary authentication service 215 and one or more secondary authentication services 218. The authentication logic 257 may comprise, for example, a browser plug-in, Ajax code, a JAVA applet, and/or other client-executable code. The client device 206 may be configured to execute applications beyond the client application 251 such as, for example, email applications, social networking applications, word processors, spreadsheets, and/or other applications.

Figure 3:
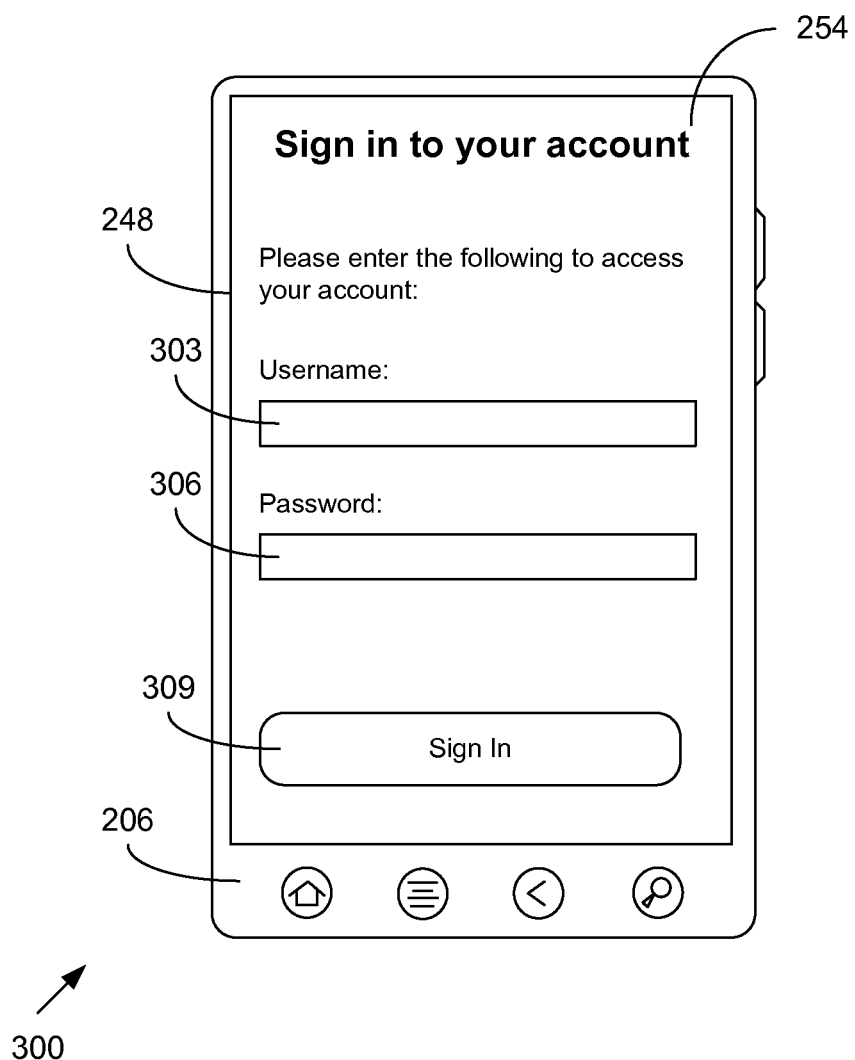
FIG. 3 is a pictorial diagram of an example user interface rendered by a client device in the networked environment of FIG. 2 according to various embodiments of the present disclosure.

Moving on to FIG. 3, shown is a pictorial diagram of a user interface 254 rendered by a client application 251 (FIG. 2) on a display 248 of a client device 206 according to various embodiments of the present disclosure. The user interface 254 corresponds to a sign-in screen of the client application 251, which is configured to elicit security credentials from a user. In particular, the user interface 254 in this example includes a form field 303 configured to elicit a username and a form field 306 configured to elicit a password. Other types of user interface elements may be used in other embodiments to elicit fingerprints, facial photos for face recognition, voice samples for voice recognition, selection of an answer to a knowledge-based question, and/or other types of security credentials.

A component 309 is provided that, when selected, is configured to submit the security credentials for authentication. In particular, the client application 251 may be configured by the authentication logic 257 (FIG. 2) to submit the username to the primary authentication service 215 (FIG. 2) and to submit the password separately to the secondary authentication service 218 (FIG. 2).

Figure 4:
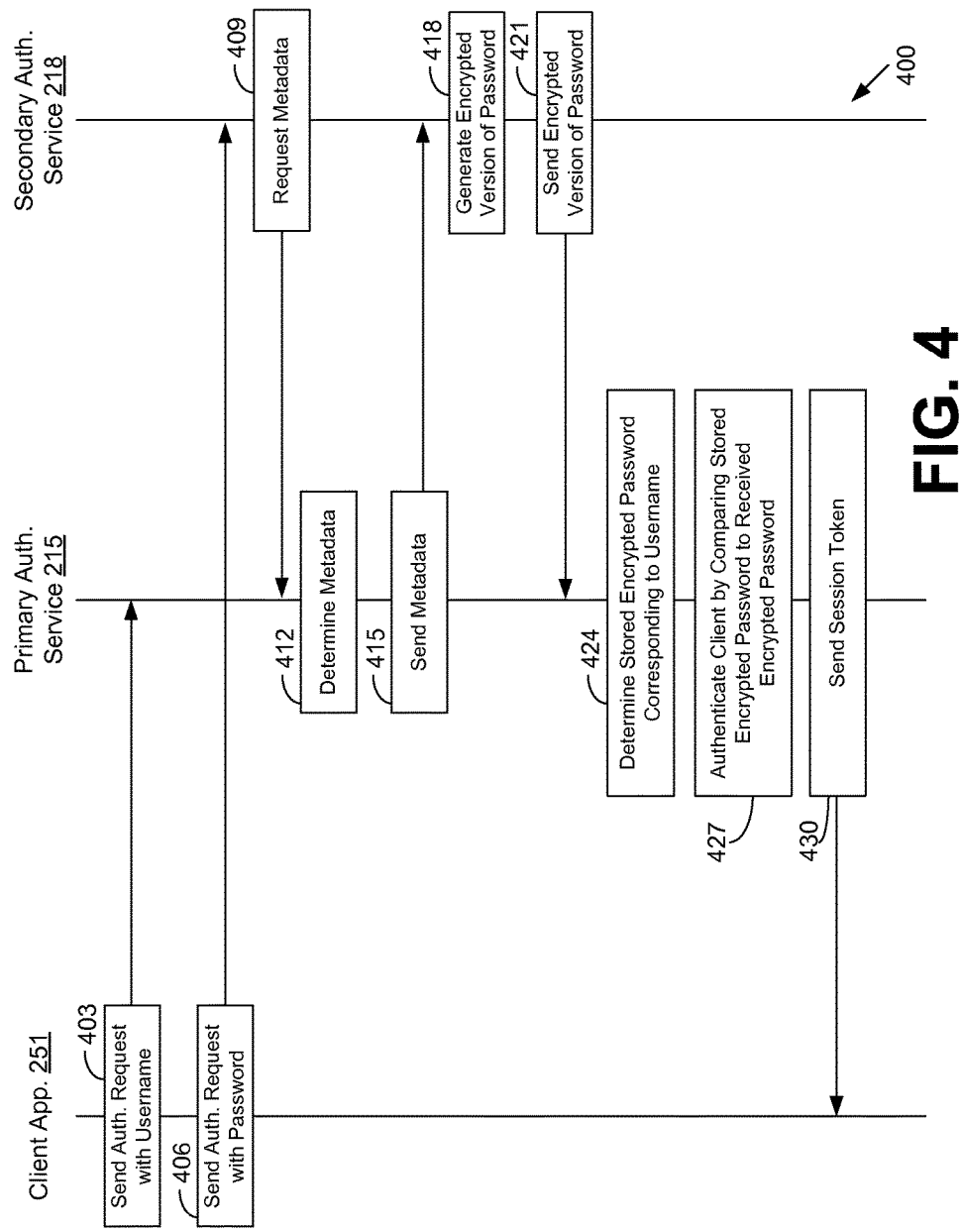
FIG. 4 is a sequence diagram illustrating one example of functionality implemented as portions of a client application, a primary authentication service, and a second authentication service executed in the networked environment of FIG. 2 according to various embodiments of the present disclosure.

Turning now to FIG. 4, shown is a sequence diagram 400 depicting one example of the operation and interaction among the client application 251, the primary authentication service 215, and the secondary authentication service 218 according to various embodiments. It is understood that the sequence diagram 400 provides merely an example of the many different types of functional arrangements that may be employed to implement the operation and interaction among the client application 251, the primary authentication service 215, and the second authentication service 218 as described herein.

Beginning with box 403, the client application 251 sends an authentication request 224 (FIG. 2) specifying a username as an identification security credential 239 (FIG. 2) to the primary authentication service 215 via the network 209 (FIG. 2). In box 406, the client application 251 sends an authentication request 242 (FIG. 2) specifying a password as a security credential 245 (FIG. 2) to the secondary authentication service 218 via the network 209.

In box 409, the secondary authorization service 218 requests metadata 233 (FIG. 2) from the primary authentication service 215 for generating an encrypted version of the security credential 245. In box 412, the primary authentication service 215 determines the metadata 233. In one embodiment, the request for the metadata 233 may include a unique identifier 236 (FIG. 2) which may be used by the primary authentication service 215 to correlate the metadata 233 with the particular authentication request 224. In another embodiment, the metadata 233 may be predetermined metadata 233 that may be used to generate many different encrypted security credentials 221. In box 415, the primary authentication service 215 returns the requested metadata 233 to the secondary authentication service 218.

In box 418, the secondary authentication service 218 generates an encrypted version of the password using the metadata 233. In box 421, the secondary authentication service 218 sends the encrypted version of the password to the primary authentication service 215. In box 424, the primary authentication service 215 determines a corresponding stored encrypted password in the encrypted security credentials 221 for the encrypted version of the password provided by the secondary authentication service 218. For example, the primary authentication service 215 may identify the encrypted security credential 221 using the unique identifier 236 and/or the identification security credential 239 as an index 230 (FIG. 2) into the encrypted security credentials 221.

In box 427, the primary authentication service 215 authenticates the client application 251 by comparing the stored encrypted password from the encrypted security credentials 221 with the encrypted version of the password received from the secondary authentication service 218. If the two match, the authentication request is successful; if the two differ, the authentication request is unsuccessful and the identity of the user at the client device 206 (FIG. 2) is not verified. In box 430, if the authentication is successful, the primary authentication service 215 generates a session token 227 (FIG. 2) and sends the session token 227 to the client application 251. The client application 251 may then utilize the session token 227 to access secured resources and/or personalizations. Thereafter, the sequence diagram 400 ends.

Figure 5:
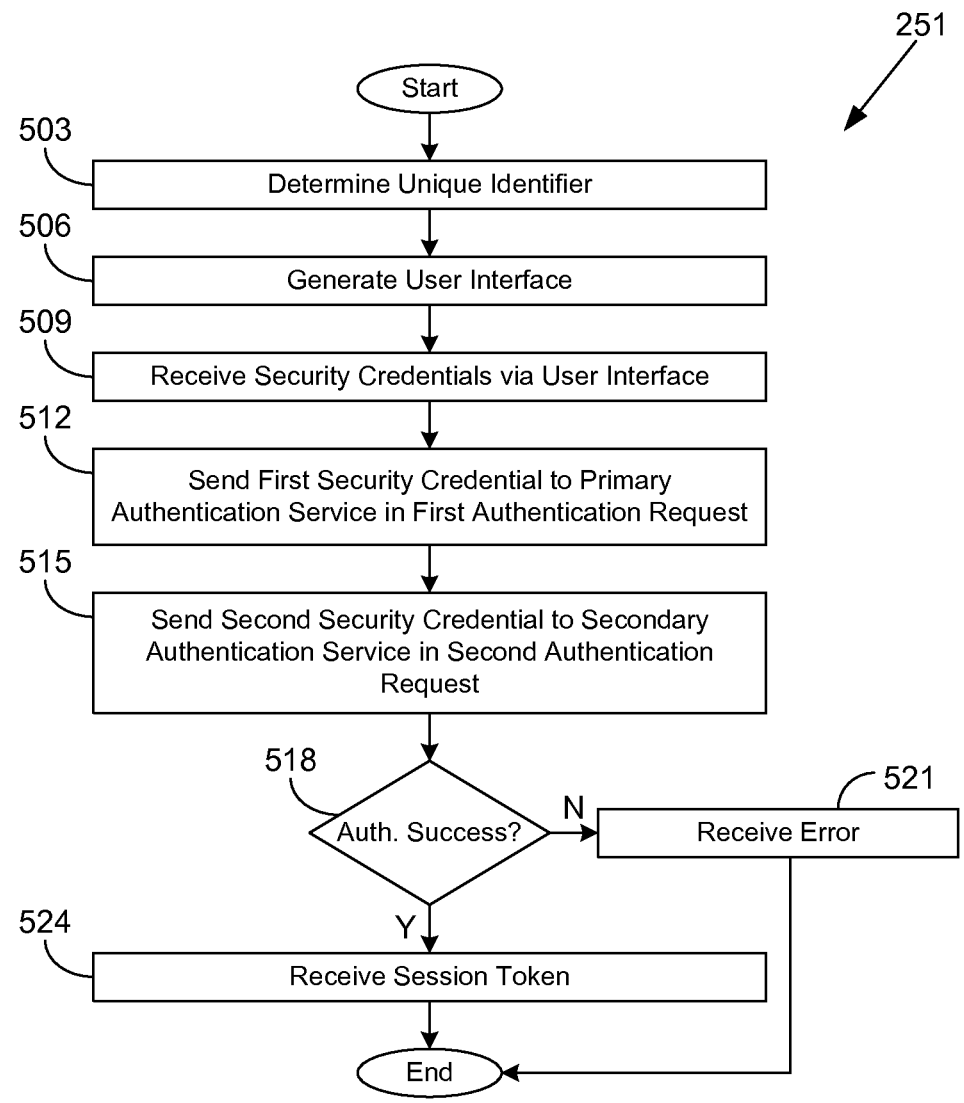
FIG. 5 is a flowchart illustrating one example of functionality implemented as portions of a client application executed in a client device in the networked environment of FIG. 2 according to various embodiments of the present disclosure.

Continuing to FIG. 5, shown is a flowchart that provides one example of the operation of a portion of the client application 251 according to various embodiments. It is understood that the flowchart of FIG. 5 provides merely an example of the many different types of functional arrangements that may be employed to implement the operation of the portion of the client application 251 as described herein. As an alternative, the flowchart of FIG. 5 may be viewed as depicting an example of elements of a method implemented in the client device 206 (FIG. 2) according to one or more embodiments.

Beginning with box 503, the client application 251 determines a unique identifier 236 (FIG. 2). The unique identifier 236 may be generated in the client device 206 or may be obtained from the computing environment 203*a* or 203*b* (FIG. 2). In some cases, the unique identifier 236 may be preexisting in the client device 206 as a universally unique identifier. In box 506, the client application 251 generates a user interface 254 (FIG. 2) and causes the user interface 254 to be rendered upon the display 248 (FIG. 2). The user interface 254 includes interface components such as form fields configured to receive a plurality of security credentials.

In box 509, the client application 251 receives a plurality of security credentials via the user interface 254. For example, a user may manually enter the security credentials, or a password manager or other automated logic may provide the security credentials programmatically. In box 512, the client application 251 sends a first security credential such as a username to the primary authentication service 215 (FIG. 2) via the network 209 (FIG. 2). The data may be sent by the client application 251 to a first network address associated with the primary authentication service 215. The first security credential may be sent in an authentication request 224 (FIG. 2) in association with the unique identifier 236. The authentication request 224 may be transmitted in an encrypted container, e.g., by secure sockets layer (SSL), transport layer security (TLS), etc.

In box 515, the client application 251 sends a second security credential such as a password to the secondary authentication service 218 (FIG. 2) via the network 209. The data may be sent by the client application 251 to a second network address associated with the secondary authentication service 218. In one scenario, the first and second network addresses may comprise different internet protocol (IP) addresses. In another scenario, the first and second network addresses may comprise the same IP address but with a different port identifier. For example, a gateway may receive encrypted network traffic on two separate ports and then forward the encrypted traffic onto the primary authentication service 215 and the secondary authentication service 218. The second security credential may be sent in an authentication request 242 (FIG. 2) in association with the unique identifier 236. The authentication request 242 may be transmitted in an encrypted container, e.g., by SSL, TLS, etc. Multiple other security credentials relating to different authentication factors may be sent to multiple secondary authentication services 218 in some implementations. Further, in some situations, different portions of a security credential may be sent to different secondary authentication services 218. For example, the first four characters of a password may be sent to one secondary authentication service 218, while the remaining characters of the password may be sent to another secondary authentication service 218.

In box 518, the client application 251 determines if the authentication is successful. If the authentication is unsuccessful, the client application 251 receives an error from the primary authentication service 215 in box 521. Thereafter, the portion of the client application 251 ends. The client application 251 may also retry additional credentials obtained via the user interface 254. If the authentication is successful, the client application 251 receives a session token 227 (FIG. 2) from the primary authentication service 215 in box 524. The client application 251 may then access secured resources and/or personalizations by presenting the session token 227 during a session. Thereafter, the portion of the client application 251 ends.

Although the above discussion assumes that the client application 251 is installed on a single client device 206, the flowchart of FIG. 5 may be performed by client applications 251 executed on separate client devices 206. For example, the first security credential may be received via a user interface 254 on a first client device 206, while the second security credential may be received via a user interface 254 on a second client device 206. The first client device 206 would then send the first security credential to the primary authentication service 215, while the second client device 206 would send the second security credential to the secondary authentication service 218. The unique identifier 236 may be shared among the client devices 206, and in some cases the unique identifier 236 may be securely generated by one of the client devices 206. The session token 227 could be received by one of the client devices 206 and then shared with the other client devices 206.

In one embodiment, the client application 251 may correspond to a proxy-based browser which operates with an intermediate proxy server in the network 209 performing server-side processing and/or caching. In order to avoid having both all security credentials available on a single host, the proxy server may be bypassed by the client application 251 in order to submit one or more security credentials to the secondary authentication service(s) 218.

Figure 6:
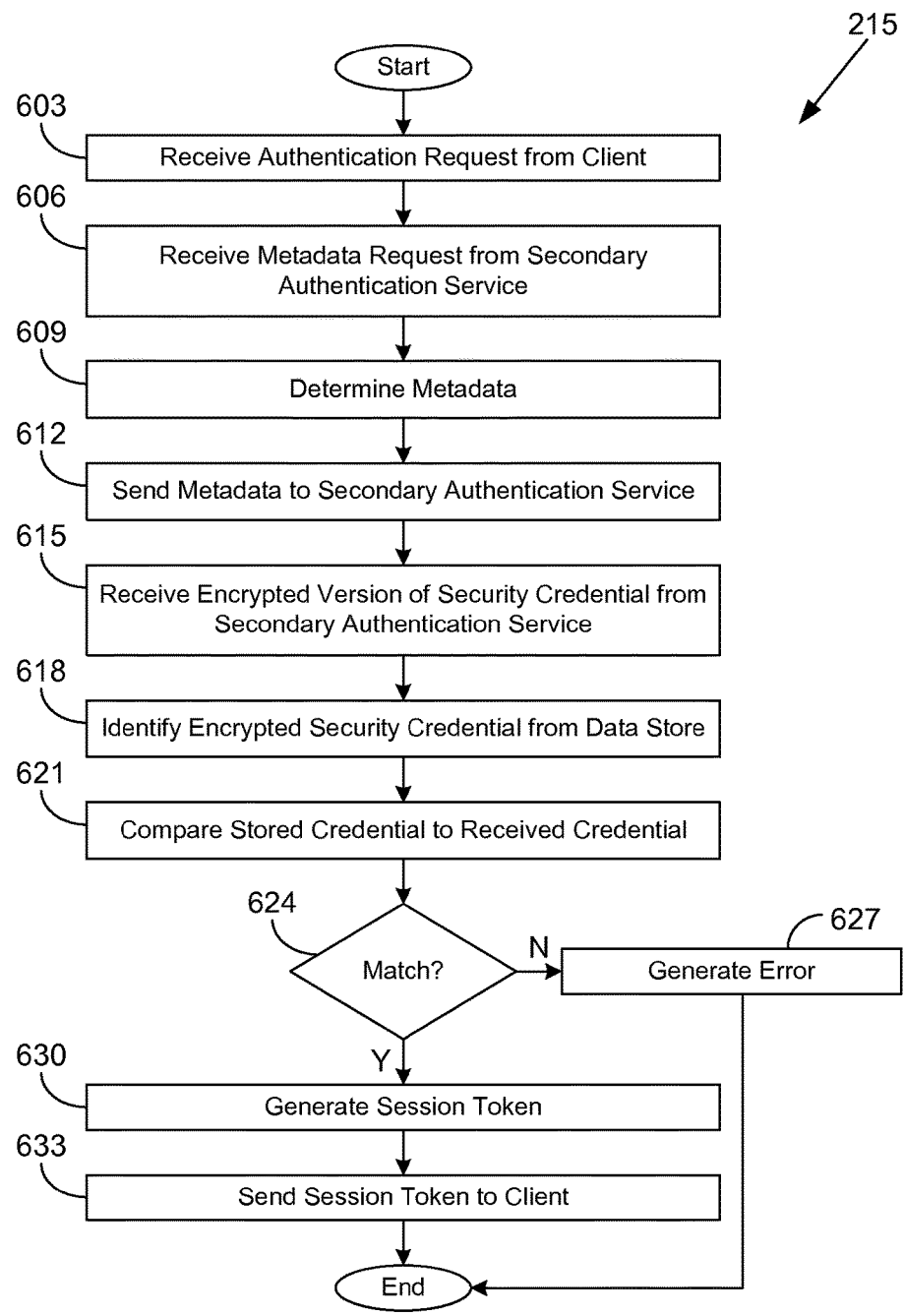
FIG. 6 is a flowchart illustrating one example of functionality implemented as portions of a primary authentication service executed in a computing environment in the networked environment of FIG. 2 according to various embodiments of the present disclosure.

Referring next to FIG. 6, shown is a flowchart that provides one example of the operation of a portion of the primary authentication service 215 according to various embodiments. It is understood that the flowchart of FIG. 6 provides merely an example of the many different types of functional arrangements that may be employed to implement the operation of the portion of the primary authentication service 215 as described herein. As an alternative, the flowchart of FIG. 6 may be viewed as depicting an example of elements of a method implemented in the computing environment 203*a* (FIG. 2) according to one or more embodiments.

Beginning with box 603, the primary authentication service 215 receives an authentication request 224 (FIG. 2) from a client device 206 (FIG. 2) via the network 209 (FIG. 2). In box 606, the primary authentication service 215 receives a request for metadata 233 (FIG. 2) from one or more secondary authentication services 218 (FIG. 2). The request may identify the metadata 233 based at least in part on a unique identifier 236 (FIG. 2).

In box 609, the primary authentication service 215 correlates the metadata 233 based at least in part on the unique identifier 236. For example, the primary authentication service 215 may determine an identification security credential 239 (FIG. 2) also associated with the unique identifier 236. The primary authentication service 215 may then locate the metadata 233 using the index 230 (FIG. 2) and the identification security credential 239. In box 612, the primary authentication service 215 sends the metadata 233 to the secondary authentication service 218.

In box 615, the primary authentication service 215 receives an encrypted version of a security credential 245 from the secondary authentication service 218. The encrypted version of the security credential 245 may be associated with the unique identifier 236 for correlation purposes. In box 618, the primary authentication service 215 identifies an encrypted security credential 221 (FIG. 2) from the data store 212*a* (FIG. 2) using the unique identifier 236. The primary authentication service 215 then compares the encrypted security credential 221 to the encrypted version of the security credential 245 received from the secondary authentication service 218 in box 621.

The primary authentication service 215 assesses in box 624 whether a match between the encrypted security credential 221 and the encrypted version of the security credential 245 occurs in order to determine authentication of the client device 206. Where multiple security credentials 245 are involved, the primary authentication service 215 may require that all or fewer than all security credentials 245 (the encrypted versions of which are received from multiple secondary authentication services 218) be evaluated for matches with encrypted security credentials 221. If a match does not occur (or if fewer than all required matches occur), the primary authentication service 215 generates an error in box 627. Thereafter, the portion of the primary authentication service 215 ends. If a match does occur (or if all required matches occur), the client device 206 is authenticated, and the primary authentication service 215 moves from box 624 to box 630 and generates a session token 227 (FIG. 2). The primary authentication service 215 sends the session token 227 to the client device 206 in box 633. Thereafter, the portion of the primary authentication service 215 ends.

Figure 7:
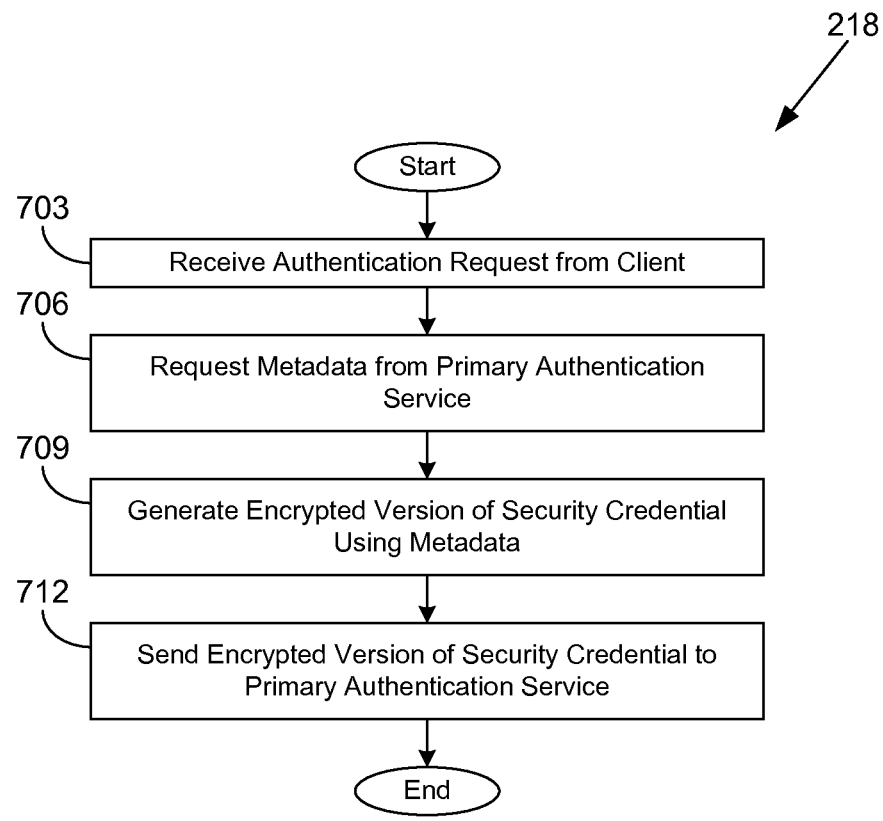
FIG. 7 is a flowchart illustrating one example of functionality implemented as portions of a secondary authentication service executed in a computing environment in the networked environment of FIG. 2 according to various embodiments of the present disclosure.

Moving on to FIG. 7, shown is a flowchart that provides one example of the operation of a portion of the secondary authentication service 218 according to various embodiments. It is understood that the flowchart of FIG. 7 provides merely an example of the many different types of functional arrangements that may be employed to implement the operation of the portion of the secondary authentication service 218 as described herein. As an alternative, the flowchart of FIG. 7 may be viewed as depicting an example of elements of a method implemented in the computing environment 203*b* (FIG. 2) according to one or more embodiments.

Beginning with box 703, the secondary authentication service 218 receives an authentication request 242 (FIG. 2) from a client device 206. The authentication request 242 may include a unique identifier 236 (FIG. 2) and a security credential 245 (FIG. 2). In box 706, the secondary authentication service 218 requests metadata 233 (FIG. 2) for generating an encrypted version of the security credential 245 from the primary authentication service 215 (FIG. 2). The metadata 233 may be requested using the unique identifier 236.

In box 709, the secondary authentication service 218 obtains the metadata 233 and generates an encrypted version of the security credential 245 using the metadata 233. In box 712, the secondary authentication service 218 sends the encrypted version of the security credential 245 to the primary authentication service 215 for further processing.

The encrypted version of the security credential 245 may be sent in association with the unique identifier 236 to facilitate correlation. Thereafter, the portion of the secondary authentication service 218 ends.

Figure 8:
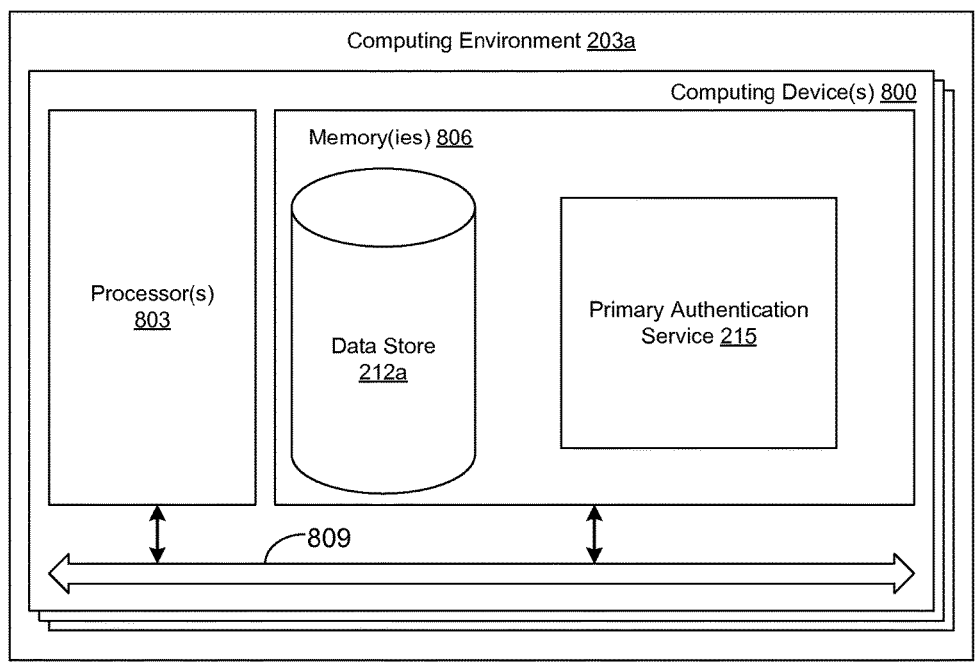
FIG. 8 is a schematic block diagram that provides one example illustration of a computing environment employed in the networked environment of FIG. 2 according to various embodiments of the present disclosure.

With reference to FIG. 8, shown is a schematic block diagram of the computing environment 203*a* according to an embodiment of the present disclosure. The computing environment 203*a* includes one or more computing devices 800. Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the primary authentication service 215 and potentially other applications. Also stored in the memory 806 may be a data store 212*a* and other data. In addition, an operating system may be stored in the memory 806 and executable by the processor 803. The computing environment 203*b* (FIG. 2) may be structured similarly to the computing environment 203*a*.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the primary authentication service 215, the secondary authentication service 218 (FIG. 2), the client application 251 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagram of FIG. 4 and the flowcharts of FIGS. 5-7 show the functionality and operation of an implementation of portions of the primary authentication service 215, the secondary authentication service 218, and the client application 251. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the sequence diagram of FIG. 4 and the flowcharts of FIGS. 5-7 show a specific order of execution, it is understood that the order of execution may differ from that which is depicted. For example, the order of execution of two or more blocks may be scrambled relative to the order shown. Also, two or more blocks shown in succession in FIGS. 4-7 may be executed concurrently or with partial concurrence. Further, in some embodiments, one or more of the blocks shown in FIGS. 4-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the primary authentication service 215, the secondary authentication service 218, and the client application 251, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the primary authentication service 215, the secondary authentication service 218, and the client application 251, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800, or in multiple computing devices in the same computing environment 203a. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications Therefore, the following is claimed:

1. A method, comprising:
   receiving, via a first computing system, a username and a unique identifier from a client;
   identifying, via the first computing system, metadata required to generate an encrypted version of a password corresponding to the username;
   sending the metadata from the first computing system to a second computing system;
   receiving, via the second computing system, the password and the unique identifier from the client;
   generating, via the second computing system, the encrypted version of the password using the metadata;
   sending the encrypted version of the password from the second computing system to the first computing system in association with the unique identifier;
   identifying, via the first computing system, a stored encrypted password corresponding to the username; and
   authenticating, via the first computing system, the client by comparing the stored encrypted password and the encrypted version of the password received from the second computing system.

2. The method of claim 1, wherein the client is configured not to provide the password to the first computing system and not to provide the username to the second computing system.

3. The method of claim 1, wherein the stored encrypted password and the encrypted version of the password are both encrypted using non-reversible encryption.

4. A system, comprising:
   at least one computing device; and
   a first authentication service executed in the at least one computing device, wherein when executed the first authentication service causes the at least one computing device to at least:
      receive a first security credential from a client via a first network address;
      receive an encrypted version of a second security credential from a second authentication service instead of from the client, wherein the second authentication service receives the second security credential from the client via a second network address;
      determine a stored encrypted credential corresponding to the second security credential based at least in part on the first security credential; and
      authenticate the client by comparing the encrypted version of the second security credential to the stored encrypted credential.

5. The system of claim 4, wherein the stored encrypted credential and the encrypted version of the second security credential are both encrypted using non-reversible encryption.

6. The system of claim 4, wherein the first security credential corresponds to a username, and the second security credential corresponds to a password.

7. The system of claim 4, wherein the stored encrypted credential is obtained from a data store of encrypted credentials, and the first security credential is a key to an index of the data store of encrypted credentials.

8. The system of claim 4, wherein when executed the first authentication service further causes the at least one computing device to at least provide metadata associated with generating the encrypted version of the second security credential to the second authentication service.

9. The system of claim 8, wherein the metadata comprises a cryptographic salt.

10. The system of claim 4, wherein when executed the first authentication service further causes the at least one computing device to at least generate a session token for the client in response to determining that the encrypted version of the second security credential matches the stored encrypted credential.

11. The system of claim 4, wherein the first security credential is received in association with a unique identifier, the encrypted version of the second security credential is also received in association with the unique identifier, and when executed, the first authentication service further causes the at least one computing device to at least correlate the first security credential with the encrypted version of the second security credential using the unique identifier.

12. The system of claim 4, wherein the second authentication service is executed in the at least one computing device, wherein when executed the second authentication service causes the at least one computing device to at least:
   receive the second security credential from the client;
   generate the encrypted version of the second security credential; and
   send the encrypted version of the second security credential to the first authentication service.

13. The system of claim 12, wherein the at least one computing device comprises a first computing device and a second computing device, the first authentication service is executed in the first computing device, and the second authentication service is executed in the second computing device.

14. A system, comprising:
   at least one computing device; and
   a first authentication service executed in the at least one computing device, wherein when executed the first authentication service causes the at least one computing device to at least:
      receive a first security credential from a client;
      receive an encrypted version of a second security credential from a second authentication service;
      determine a stored encrypted credential corresponding to the second security credential based at least in part on the first security credential;
      authenticate the client by comparing the encrypted version of the second security credential to the stored encrypted credential; and
   obtain an identifier from another service using the first security credential, wherein the stored encrypted credential is obtained from a data store of encrypted credentials, and the identifier is a key to an index of the data store of encrypted credentials.

15. A system, comprising:
   at least one computing device; and
   a first authentication service executed in the at least one computing device, wherein when executed the first authentication service causes the at least one computing device to at least:
      receive a first security credential from a client;
      receive an encrypted version of a second security credential from a second authentication service;
      determine a stored encrypted credential corresponding to the second security credential based at least in part on the first security credential;

authenticate the client by comparing the encrypted version of the second security credential to the stored encrypted credential; and provide metadata associated with generating the encrypted version of the second security credential to the second authentication service, wherein the metadata comprises a parameter for a key derivation function used to generate the encrypted version of the second security credential, or the metadata comprises a cryptographic salt.

16. A system, comprising:

at least one computing device;

a first authentication service executed in the at least one computing device, wherein when executed the first authentication service causes the at least one computing device to at least:

receive a first security credential from a client;

receive an encrypted version of a second security credential from a second authentication service;

determine a stored encrypted credential corresponding to the second security credential based at least in part on the first security credential; and authenticate the client by comparing the encrypted version of the second security credential to the stored encrypted credential; and a third authentication service executed in the at least one computing device, wherein when executed, the third authentication service causes the at least one computing device to at least:

receive a third security credential from the client;

generate an encrypted version of the third security credential; and send an encrypted version of the third security credential to the first authentication service; and wherein authenticating the client further comprises verifying the encrypted version of the third security credential.

17. A method, comprising:

causing, via a client device, a user interface to be rendered, the user interface being configured to receive a first security credential and a second security credential;

receiving, via the client device, the first security credential and the second security credential by way of the user interface;

sending, via the client device, the first security credential to a first authentication service at a first network address;

sending, via the client device, the second security credential to a second authentication service at a second network address, wherein the client device refrains from sending the first security credential to the second authentication service and refrains from sending the second security credential to the first authentication service; and receiving, via the client device, an indication from the first authentication service as to an authentication outcome.

18. The method of claim 17, wherein the first security credential is a username, and the second security credential is a password.

19. The method of claim 17, further comprising:

receiving, via the client device, a third security credential by way of the user interface; and sending, via the client device, the third security credential to a third authentication service at a third network address.

20. The method of claim 17, wherein the first security credential is sent to the first authentication service in association with a unique identifier, and the second security credential is sent to the second authentication service in association with the unique identifier.

* * * * *